Sept. 22, 1931.  H. H. CUTLER  1,824,536
INTERNAL COMBUSTION ENGINE
Filed Nov. 2, 1927   6 Sheets-Sheet 3
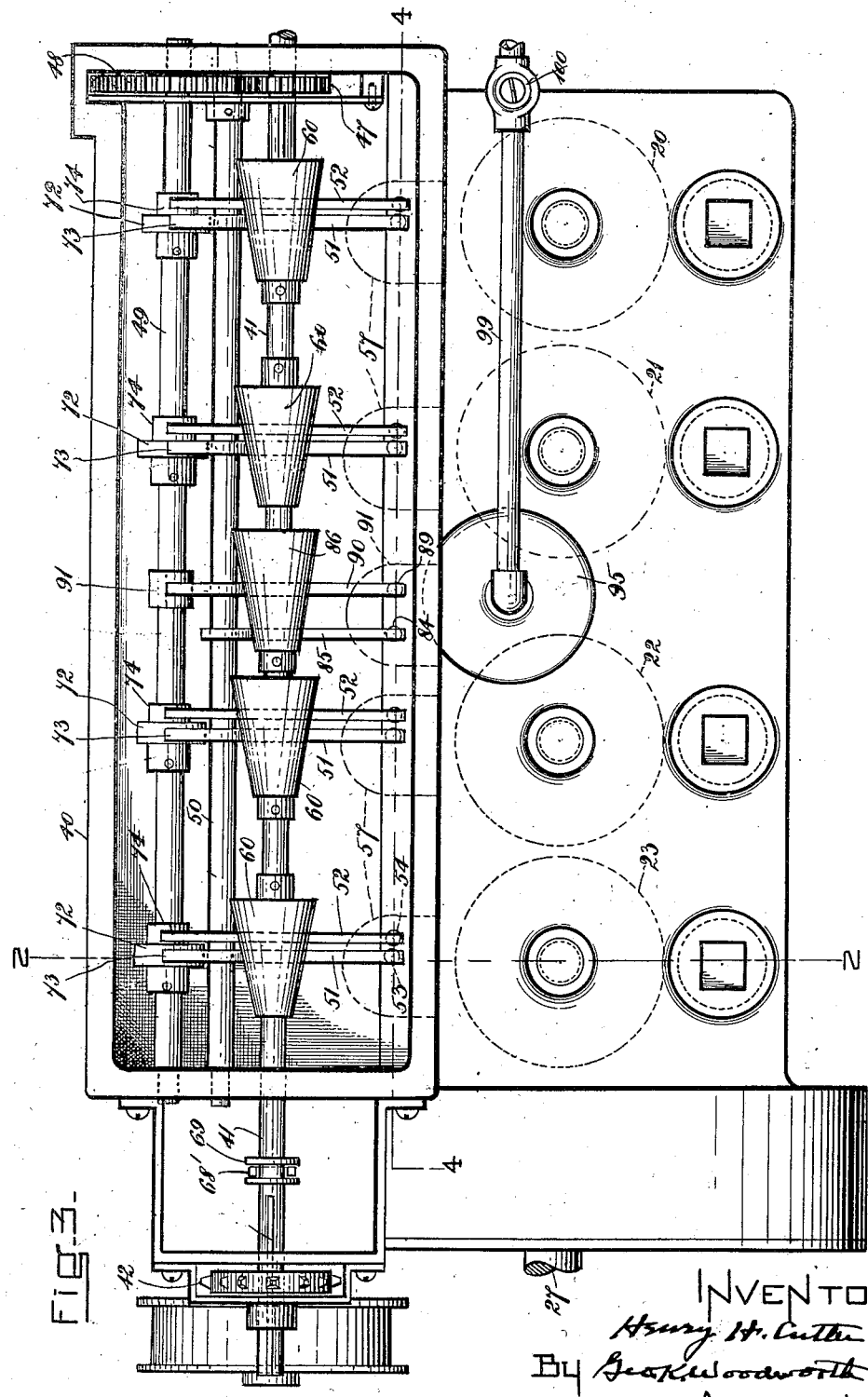

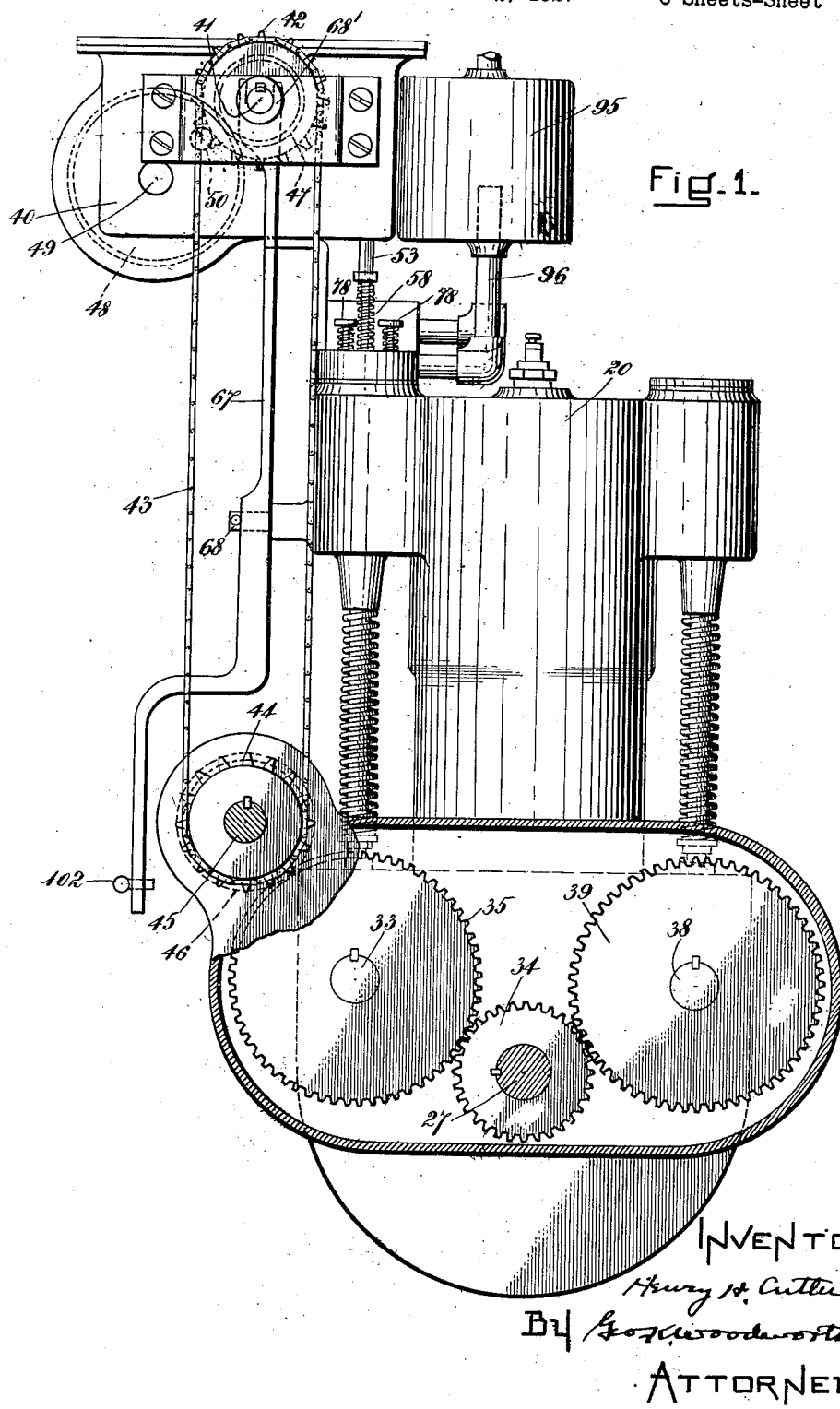

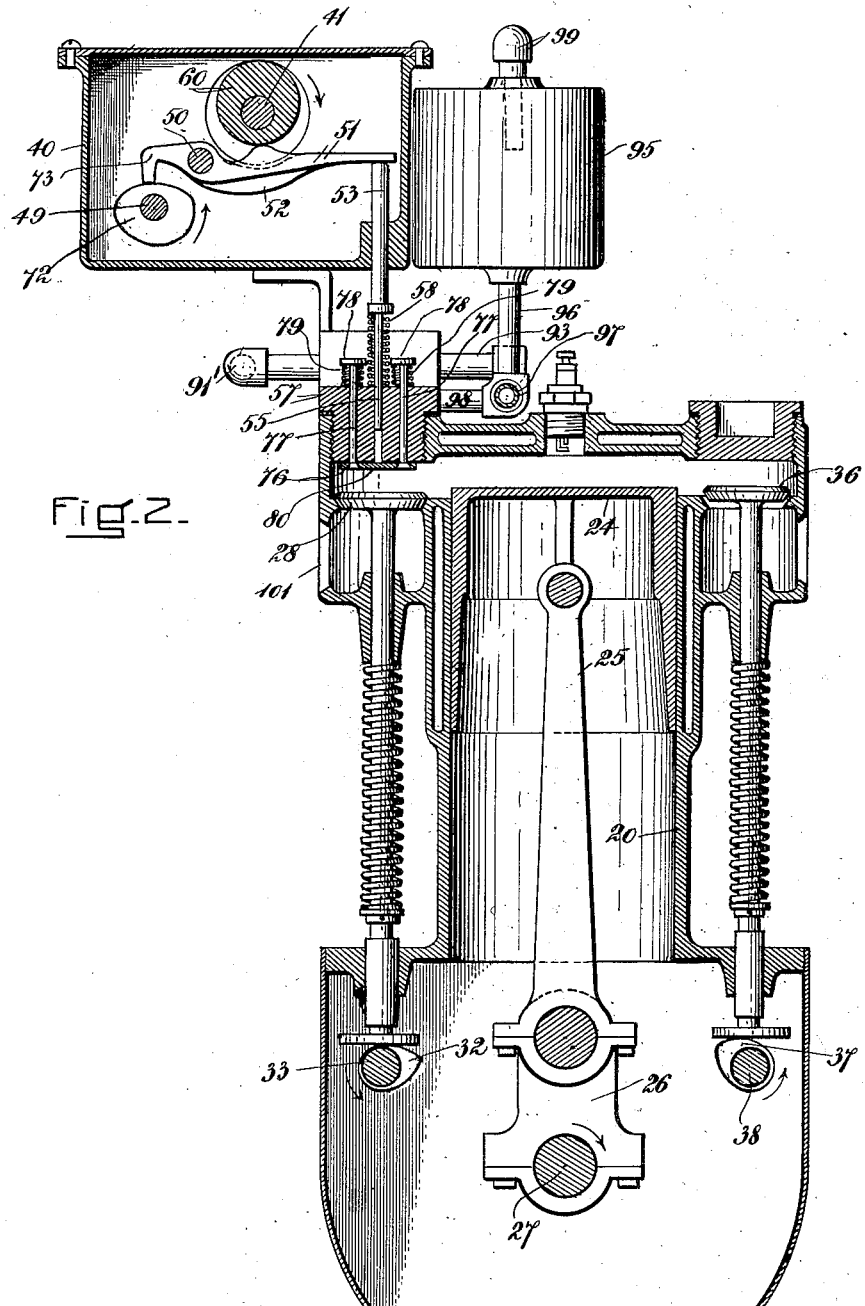

Sept. 22, 1931.  H. H. CUTLER  1,824,536
INTERNAL COMBUSTION ENGINE
Filed Nov. 2, 1927  6 Sheets-Sheet 4

INVENTOR=
Henry H. Cutler
BY Geo. K. Woodworth
ATTORNEY=

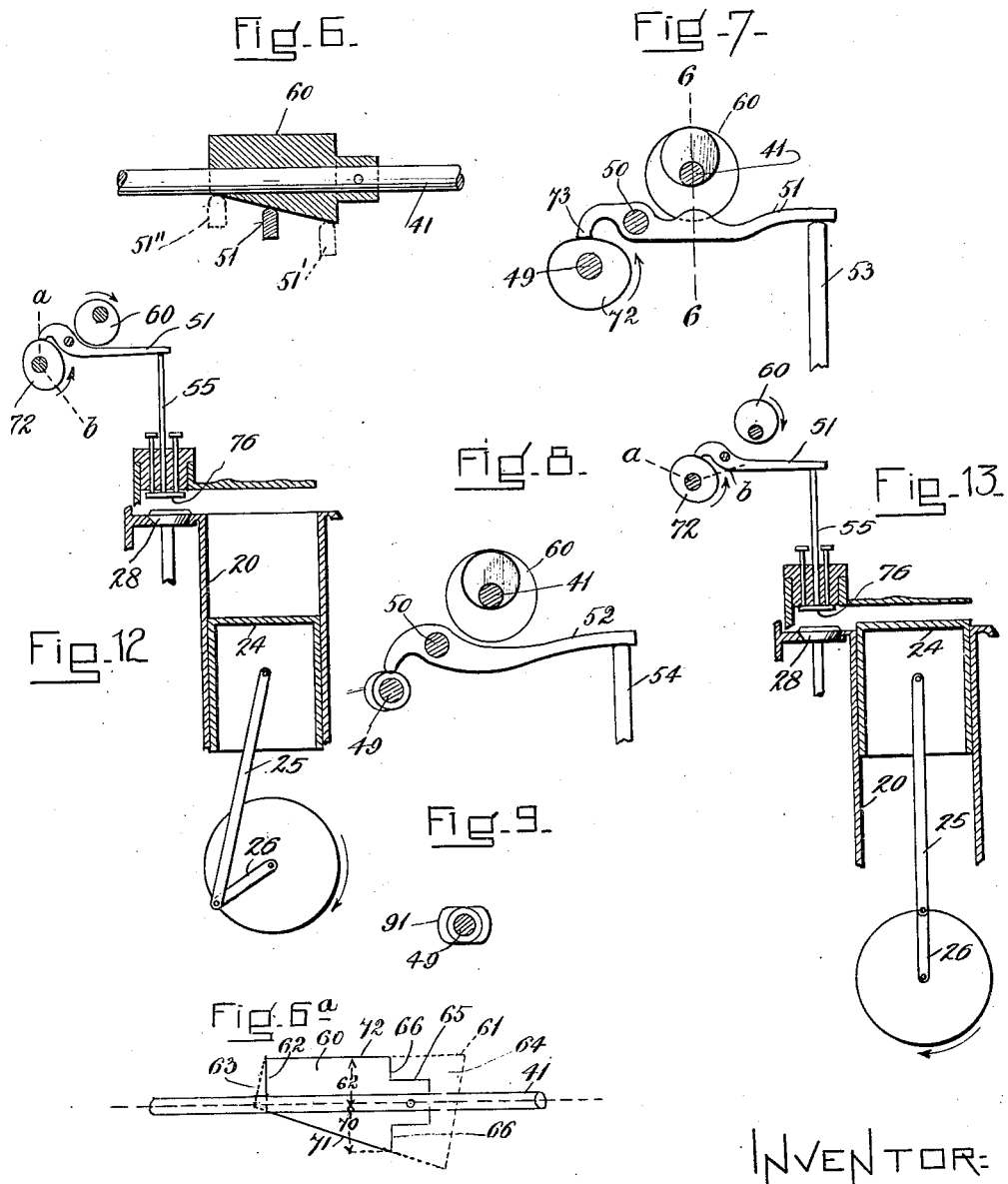

Sept. 22, 1931.     H. H. CUTLER     1,824,536
INTERNAL COMBUSTION ENGINE
Filed Nov. 2, 1927     6 Sheets-Sheet 6
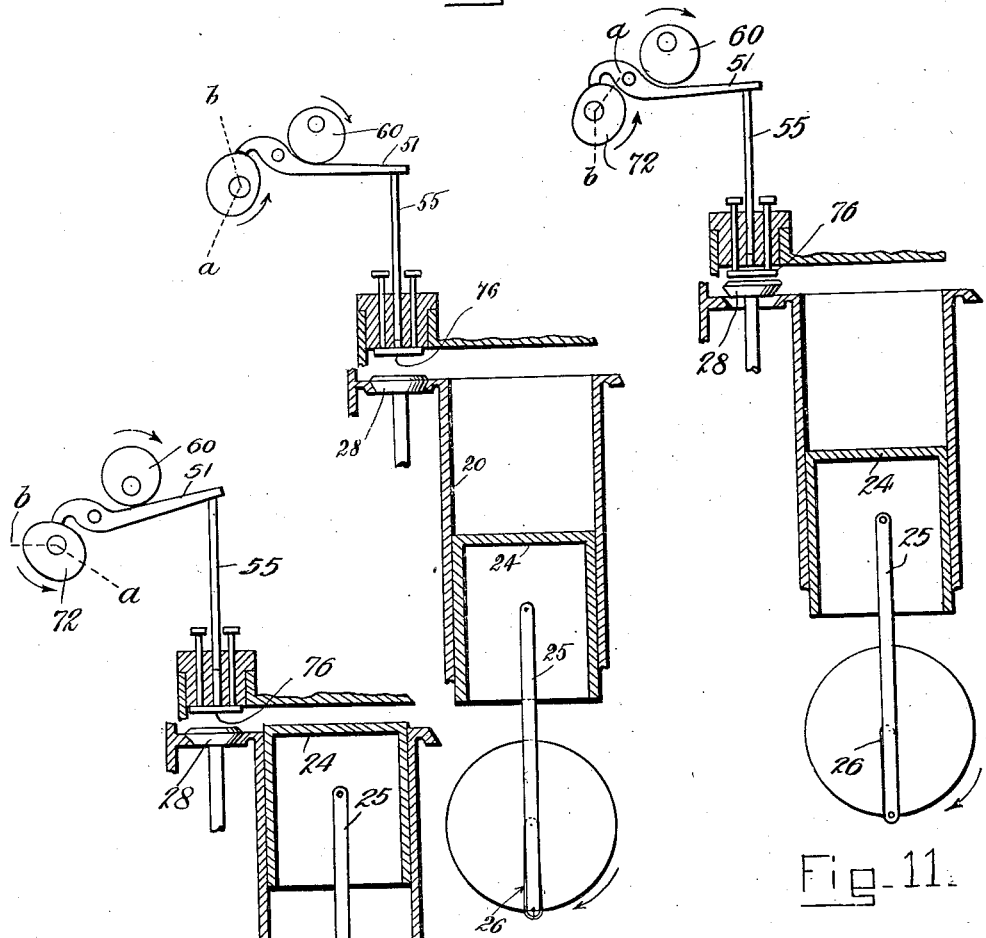

Patented Sept. 22, 1931

1,824,536

UNITED STATES PATENT OFFICE

HENRY H. CUTLER, OF BROOKLINE, MASSACHUSETTS

INTERNAL COMBUSTION ENGINE

Application filed November 2, 1927. Serial No. 230,488.

My invention relates to internal combustion engines and more especially to mechanism for mechanically supplying liquid fuel and air to such engines without the use of a carburetor.

The general object of my invention is to overcome the limitations to which the present methods of carburetion are subject by providing means whereby synchronism is obtained between a mechanically-created influx of air and a mechanically-created influx of liquid fuel, and whereby the ratio of the rate of such influx of liquid fuel to the rate of the influx of air flowing into said cylinder while the air intake valve is open, is maintained approximately constant.

Special objects of my invention are to provide means for varying the liquid fuel supply according to the engine load; to provide means for obtaining a rich mixture surrounding the spark plug, especially when the engine is idling or operating under light loads; to provide a novel means for actuating the plunger of the fuel pump on its delivery stroke in synchronism with the power piston of the engine during the first portion of the intake stroke of said power piston, and other means for completing said delivery stroke during the remaining portion of said intake stroke and part of the compression stroke of the power piston, and for holding said plunger at the end of its delivery stroke during a portion of the compression stroke of the power piston and during the entire power stroke thereof; and otherwise to simplify and improve the construction, and increase the efficiency, of internal combustion engines.

With the foregoing objects in view, my invention comprises an internal combustion engine having a mechanically-driven fuel pump associated therewith, and mechanism for correlating the movement of the plunger of said pump with the movements of the power piston and air intake valve in such manner that the influx of liquid fuel is synchronized with the influx of the air flowing into the cylinder while the air intake valve is open, and for maintaining practically constant the ratio of the rate of such influx of liquid fuel to the rate of the influx of air flowing into said cylinder while said valve remains open.

My invention comprises also manually actuated means for varying the volume of the liquid fuel supplied to the engine in accordance with the load on the latter.

My invention further comprises a novel arrangement of cams for actuating the plunger of the fuel pump, one cam effecting the first portion of the delivery stroke of said pump in synchronism with the intake stroke of the power piston, and the other completing such delivery stroke at greater speed and then holding said plunger at the end of said stroke during a portion of the compression stroke of the power piston and during the entire power stroke of the latter.

My invention comprises also the various parts and combination of parts hereinafter more fully described and set forth in the appended claims.

My invention may best be understood by having reference to the drawings accompanying and forming a part of this specification in which—

Figure 1 is a front elevation of a four-cylinder vertical engine of the T-type embodying my invention;

Fig. 2 is a vertical section taken on the line 2—2 of Figure 3;

Fig. 3 is a plan view with the cover plate of the fuel pump casing removed;

Fig. 6 is a longitudinal, vertical section of one of the conical fuel pump actuating cams taken on the line 6—6 of Fig. 7;

Figures 4, 5:
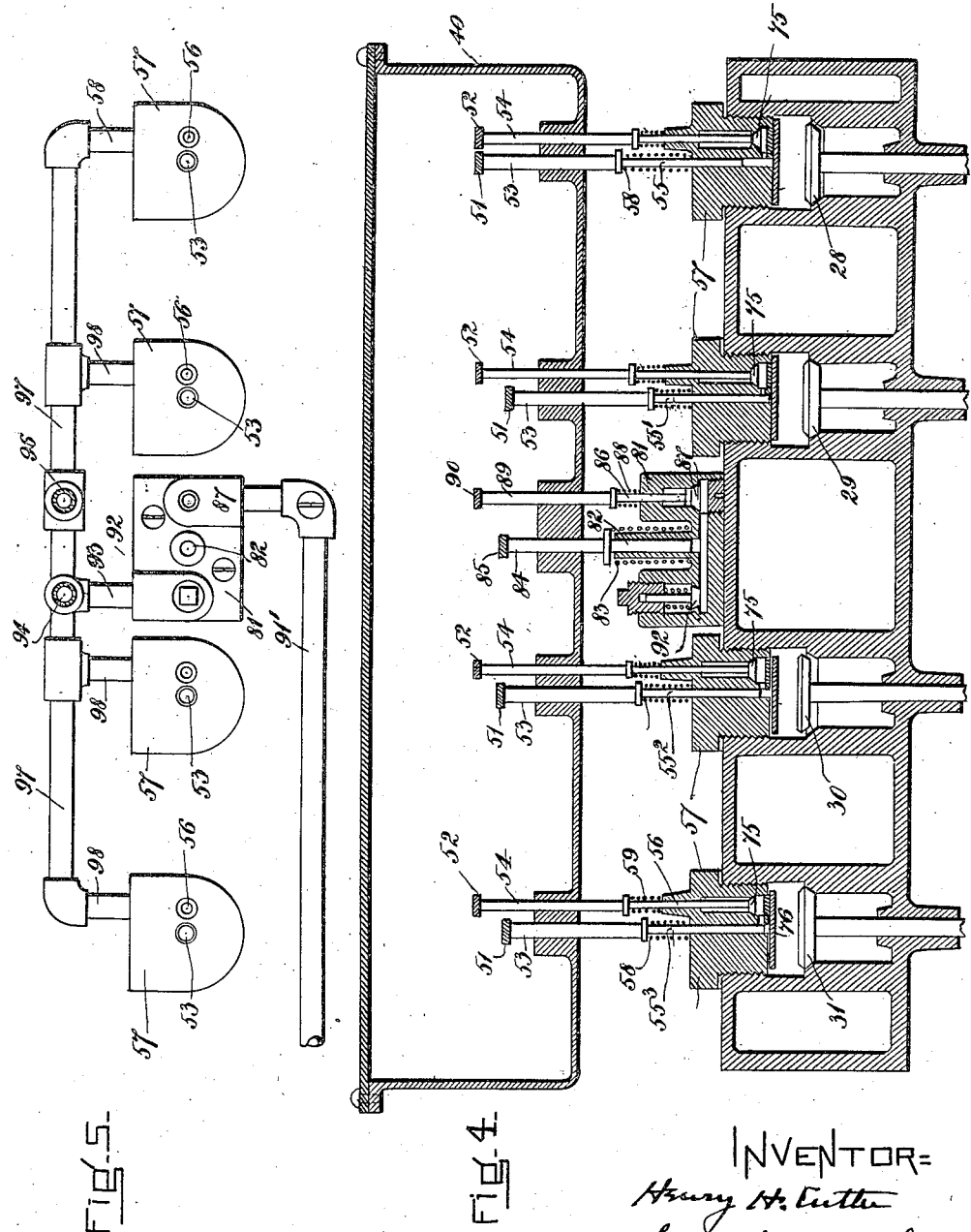
Fig. 4 is a vertical section taken on the line 4—4 of Figure 3, with the fuel pump cams and associated parts omitted.
Fig. 5 is a plan view of the pipe connections for the fuel pumps and tanks.

Fig. 6ª is a diagram illustrating the construction of the conical cams;

Fig. 7 is an elevation of the fuel pump plunger-actuating mechanism;

Fig. 8 is an elevation of the fuel pump intake valve-actuating mechanism;

Figure 9 is an end view of the double cam controlling the fuel supply pump intake valve;

Figures 10 to 14, inclusive, are kinematic diagrams hereinafter more fully referred to in explaining the cycle and operation of the engine.

In the particular drawings selected for more fully disclosing the principle of my invention and which are to be considered as illustrative merely and not restrictive, 20, 21, 22 and 23 represent the cylinders of a four-cylinder internal combustion engine of the T-type, although it is to be understood that I do not limit myself either as to the number of cylinders or the type of the engine in which my invention is embodied, said invention being well adapted to engines of the L-type, as well as to such other types as the overhead poppet valve or sleeve valve engines, by making suitable modifications and changes in locations of elements, as well understood by those skilled in the art. Each cylinder is provided with a piston 24 pivotally connected by the pitman 25 to the crank shaft 26 which is secured to the power shaft 27 shown by the arrow as having clockwise rotation.

Each cylinder is provided with an air intake valve 28, 29, 30, 31 actuated by cams 32, each mounted on the cam shaft 33 which is driven by the power shaft 27 through the intermediary of the gears 34, 35. Associated with each cylinder is an exhaust valve 36 actuated by cams 37, each mounted on the shaft 38 which is driven by said gear 34 meshed with the gear 39.

The gear 34 having one-half the pitch diameter of the gears 35 and 39, it follows that the cam shafts 33, 38 rotate at one-half crank shaft speed.

Suitably mounted above the cylinders is a casing 40 in the ends of which is mounted for rotational and reciprocatory movement the cam shaft 41 carrying the sprocket 42 which is driven by means of the chain 43 and the sprocket 44, the latter being keyed to the shaft 45 and rotated by the gear 46 which is also keyed to said shaft and meshes with the gear 35. The gear 46 having the same pitch diameter as the gear 34, the shafts 41 and 45 will rotate at crank shaft speed.

It is to be understood of course that a variety of means may be employed to drive the cam shaft 41 at crank-shaft speed, and that I do not limit myself to the particular arrangement shown.

The gear 47 splined to the shaft 41 near the outer end of the latter meshes with the gear 48 which is secured to the shaft 49 journalled in the casing 40 and disposed parallel to the shaft 41, the said gear 48 having twice the pitch diameter of the gear 47 so that said shaft 49 rotates at one-half the speed of the shaf 41. A stationary shaft 50 mounted in the ends of the casing 40 is arranged parallel to the shafts 41, 49 and carries the levers 51, 52, cooperatively, respectively, with the tappets 53, 54 against the lower ends of which the plunger 55 and intake valve stem 56 of the pump 57 are held in engagement by the springs 58, 59, respectively.

Carried by the shaft 41 are four conical cams 60 arranged to co-operate with the levers 51 for driving the pump plungers 55 on their delivery strokes against the compression of the springs 58. Each conical cam is mounted eccentrically upon the shaft 41, as shown in Fig. 6, in order to vary the length of the delivery stroke of the pump plungers 55 in accordance with the load on the engine, as hereinafter more fully explained.

While it is to be understood that I do not limit myself to the particular means illustrated for effecting such variable delivery stroke, the preferred construction is as follows:

A truncated cone 61 is bored longitudinally in a direction parallel to a generatrix thereof, the distance 62 between the axis of said bore and said generatrix being equal to the maximum delivery stroke of the pump 57. The truncated cone so bored is then placed on a mandrel and the smaller end thereof squared off at right angles to the axis of said mandrel, as indicated by the line 62 of Fig. 6a, the portion 63 being removed from the upper base of the cone. The portion 64 of the lower base is then cut off, leaving the hub 65 for rigidly connecting the cam to the shaft 41 and the base 66 which is normal to the axis of said shaft.

As above stated, the shaft 41 is mounted for longitudinal as well as rotational movement in the casing 40, and such longitudinal movement is effected, in the present instance, by the lever 67 fulcrumed on the engine casing at 68, and provided with a bifurcated upper end 68′ disposed between the flanges of a flanged sleeve 69 attached to said shaft 41, whereby the rocking of said lever 67 will shift the position of said shaft 41 longitudinally of the casing 40 so that different portions of the surface of each cone will co-operate with the tappets 53 in accordance with the position of said lever. As indicated in Fig. 6, the lever 51 when midway between the ends of the cam 60 will operate the plunger 55 at half stroke, but when the cone is moved to its extreme left-hand position and said lever is in contact with said cone near the right-hand end thereof, as shown at 51′, no movement at all is imparted to said lever, because the distance 70 from the axis of the shaft 41 to the generatrix 71 is equal to the distance from said axis to the generatrix 72 which, as aforesaid, is parallel to said axis. When said cam is moved to its extreme right-hand position, the spring 58 will raise the plunger 55, the tappet 53 and the lever 51 to the maximum permissible extent, that is to say, a distance equal to the maximum delivery stroke of said pump plunger, the relative position of said lever 51 and cam 60 in such case being indicated in dotted lines at 51" in Fig. 6. The lowermost position of each pump plunger is independent of the longitudinal position of the cams 60.

Mounted on and rigidly secured to the shaft 49 which, as aforesaid rotates at one-half the speed of the shaft 41 and therefore at one-half of crank shaft speed, are cams 72, each co-operating with the outer end 73 of one of the levers 51 whereby, as hereinafter more fully explained, said levers, and consequently the pump plungers 55 are each given additional movement after the cams 60 have ceased to co-operate with the levers 51 and whereby each pump plunger is held at the lower end of its delivery stroke during the greater portion of the compression stroke of the power piston and during the entire power stroke of the latter.

Mounted on and rigidly connected to said shaft 49 are cams 74 for controlling the movement of the levers 52 and the fuel pump intake valves 75, the stems 56 of which, as aforesaid, are normally pressed by the springs 59 against the lower ends of the tappets 54 with the upper ends of which said levers 52 are in engagement. Each feed pump 57 is shown in the present instance as screwed into the engine head directly over the intake valve 28, 29, 30, 31 in place of the plug usually employed in engines of the T-type.

Normally held against the base of each said pump is a disc 76 supported by the pins 77 passing through said pump and provided at their upper ends with heads 78 between which, and the top of the pump, are interposed the springs 79.

As will be obvious, the pressure created in the pump outlet 80 by the delivery stroke of the plunger 55, will force the disc 76 downwardly a very short distance against the compression of the springs 79, such downward movement being limited by the heads 78.

Located on the engine head is the main fuel pump 81 provided with a plunger 82 normally pressed by the spring 83 into engagement with the tappet 84, which in turn is held in engagement with the lever 85 mounted on the stationary shaft 50.

A conical cam 86 identical in construction with the conical cam 60 serves to actuate the lever 85 and effect the delivery stroke of said plunger 82. The stem 86 of the intake valve 87 of the main pump is held in engagement by the spring 88 with the tappet 89, which in turn co-operates with the lever 90 mounted on the stationary shaft 50 and controlled by the double cam 91 on the shaft 49. The chamber of the inlet valve 87 is connected by a pipe 91' with a fuel supply tank (not shown), and between said tank and said chamber, said pipe is provided with a check valve (not shown) for preventing the flow of fuel from said pipe back into the main supply tank.

The chamber of the outlet valve 92 of the main fuel pump is connected by the pipes 93, 94 with a small cylindrical air-tight tank 95, the bottom of which is connected by a pipe 96 to the distributor pipe 97 having branches 98 connected with the chambers above the intake valves 75 of each of the fuel pumps 57. A third pipe 99 provided with an adjustable back-pressure valve 100 connects the top of the tank 95 with the main supply tank and preferably projects a short distance downwardly into said tank.

The operation is as follows:

When the piston 24 is at upper dead center, as shown in Fig. 2, with respect to cylinder 20, the exhaust valve 36 is about to close, the intake valve 28 is about ready to open, and the fuel pump plunger 55 is at the end of its up-stroke. Rotation of the crank shaft in a clockwise direction draws said piston downwardly on its intake stroke and simultaneously therewith the cam 60 actuates the pump piston through the lever 51 and tappet 53, thus effecting the delivery of fuel to the cylinder simultaneously with the intake stroke of the engine piston. The air intake valve 28 opens shortly after the power piston begins its intake stroke. The acceleration of the pump plunger increases at approximately the same rate as that of the engine piston so that said plunger and piston move downwardly in synchronism during the first portion of the intake stroke of the piston until the crank shaft has made about one-quarter of a revolution, and the power piston has completed approximately one-half of its intake stroke, and has reached its maximum speed. As a result of such synchronism, the ratio of the rate of the influx of liquid fuel mechanically injected into the cylinder to the rate of the influx of air drawn into the cylinder through the intake 101 is maintained substantially constant. When the power piston has completed about one-half of its intake stroke, the influx of air has not only attained its maximum velocity, but has also acquired considerable momentum, in consequence of which it continues to flow into the cylinder at a rate of speed higher than that corresponding to the movement of the power piston. In fact, by virtue of such momentum, the air continues to flow into the cylinder long after the power piston has completed its intake stroke and has started on its compression stroke, a fact so well recognized that it is the universal practice to hold the intake valve partly open long after the completion of the power piston intake stroke.

When the crank shaft has completed approximately one-quarter of a revolution and the power piston about one-half of its intake stroke, and shortly before the conical cam 60 has forced the lever 51 downwardly as far as it can, the supplemental cam 72 comes into engagement with the end 73 of said lever and completes the delivery stroke of the pump plunger in substantial accordance with the rate of speed of the air influx above mentioned until the crank shaft has reached a point about 60° beyond lower dead center, whereupon the pump plunger is then held in its lowermost position during the remainder of the compression stroke and during the entire power stroke.

As above stated, the ratio of the rate of the influx of liquid fuel to the rate of the influx of air is maintained practically constant from the time of opening of the air intake valve until the time of co-operation of the supplemental cam with the end 73 of the lever 51.

By virtue of the completion of the pump plunger stroke effected by said supplemental cam, said ratio is continued approximately constant until the closing of the intake valve at the time the crank 26 has passed about fifty degrees beyond lower dead center. As the result of such maintenance of constancy of the said ratio, a uniform mixture of air and fuel is obtained similar to that delivered into the intake manifold by the usual type of suction carburetor. The supplemental cam continues to force the pump plunger downwardly for about ten degrees of crank shaft rotation after the air intake valve has closed, thereby producing a rich mixture in the immediate neighborhood of the spark plug.

As already explained, the pressure of the liquid fuel in the pump delivery duct 80 against the disc 76 forces the latter a few thousandths of an inch away from the lower face of the pump 57 so that the liquid fuel enters the combustion chamber in the form of a very fine spray. The amount of fuel supplied to the engine cylinders may be varied by the operator as aforesaid, and one convenient means whereby this may be accomplished is shown in Fig. 1 as a rod 102 articulated to the lower end of the lever 67. When the engine is used in automobiles, the rod 102 may be the rod with which most motor vehicles are supplied, for advancing the spark, such rod being connected to a lever on the steering wheel. When the engine is idling or operating under a light load, little or no fuel is admitted to the engine cylinder during the intake stroke of the power piston, because the relative position of the conical cams and levers 51 will be substantially that shown at 51' in Fig. 6 and nearly, if not all the fuel will be sprayed into the cylinder after the power piston has begun its compression stroke, the delivery stroke of the pump plunger being effected in such instance by the supplemental cam 72. This results in a substantial saving of fuel and provides a sufficiently rich mixture surrounding the spark plug to assure the firing of the charge. This also makes it possible to use a higher compression of the air drawn into the cylinder by mixing the fuel with the air that is last drawn in, and consequently immediately surrounds the spark plug. This results in a saving of fuel which cannot be obtained by any type of suction carburetor.

The relative position of the parts as shown in Fig. 4 corresponds to that of a four-cylinder engine design to fire in 1, 3, 4, 2 order, the cylinders 20, 21, 22, 23 being Nos. 1, 2, 3, 4 cylinders, respectively.

When the piston of No. 1 cylinder is about to begin its intake stroke, the several elements shown in Fig. 4 have the positions therein indicated. It will be noted that the plunger 55 of the fuel pump associated with No. 1 cylinder is about to begin its delivery stroke, the plunger 55' is held down in its lowermost position, the plunger $55^2$ has not quite completed its delivery stroke, and the plunger $55^3$ is about to begin its suction stroke; and that all the air intake valves 28, 29, 30, 31 are closed, except valve 30 of No. 3 cylinder.

Having reference to Figs. 10 to 14 inclusive and without limiting myself to precise numerical values, the cycle may be explained as follows:

At the beginning of the intake stroke when the crank shaft is at upper dead center, the fuel pump piston 55 is at the upper end of its stroke, the spring 58 forcing said piston against the lever 51 which is now in contact with the conical cam 60 and the outer end 73 thereof is not yet in contact with the supplemental cam 72. The intake valve, shown as closed at upper dead center in this particular instance, may start to open at any point from about one to ten degrees of crank shaft rotation beyond the beginning of the intake stroke. The position of the parts at the beginning of the intake stroke is shown in Fig. 10.

Continued rotation of the crank shaft in a clockwise direction results in further opening the intake valve. As the power piston descends, the conical cam forces the pump plunger downwardly, thereby feeding fuel into the combustion chamber, until the crank shaft has reached a position about ninety degrees from upper dead center, whereupon the supplemental cam engaging the end 73 of the lever forces said end upwardly, thereby disengaging said lever from said conical cam and forcing the other end downwardly so that the downward stroke of the pump plunger and the feeding of fuel to the combustion chamber are continued. At the lower dead center position, the intake valve has started to close and the fuel pump piston is near the end of its downward stroke, as shown at Fig. 11.

About fifty degrees clockwise from lower dead center, the intake valve has closed, and about ten degrees farther on, the pump plunger has reached the end of its down stroke, in which position it is held for a while by the co-operation of the arcuate portion a—b of the supplementary cam 72 and the lever 51, the position of the parts assumed when the crank shaft is sixty degrees in a clockwise direction from lower dead center being shown in Fig. 12. It will be noted that in this position, the conical cam is out of engagement with the lever.

At the end of the compression stroke represented in Fig. 13, the intake valve is still on its seat, having remained in that position ever since the crank shaft reached a point about fifty degrees clockwise of lower dead center, and the pump plunger is held in its lowermost position by said arcuate portion of the supplemental cam, such position having been assumed, as aforesaid, when the crank shaft arrived about sixty degrees clockwise of lower dead center.

The charge is now ignited and at the end of the power stroke shown in Fig. 14, the intake valve is still closed and the pump plunger is rising, the arcuate portion of the supplemental cam having passed beneath the end 73 of the lever a few degrees before the end of the power stroke.

The spring 58 begins to force the pump plunger upwardly as soon as the arcuate portion a—b of the supplementary cam passes beneath the end 73 of the lever and the upward movement of said plunger is now governed by the co-operation of said lever with the conical and the supplemental cams, each of which, throughout the scavenging stroke, co-operates with said lever at portions thereof which, respectively, have progressively decreasing radii until the position shown in Fig. 10, viz, the beginning of the intake stroke, is reached and said pump plunger is at the end of its upward stroke.

It will be noted that I obtain a synchronism between a mechanically-created influx of air and a mechanically-created influx of liquid fuel, and that the ratio of the rate of one such influx to the other is maintained approximately constant while the air intake valve is open from a point between one degree to ten degrees of crank shaft rotation beyond the beginning of the power piston intake stroke, to about fifty degrees of such rotation beyond the end of such intake stroke. By virtue thereof, my invention will produce greater economy when used with standard commercial gasolene than can be obtained by the present methods of carburetion, and fuel of as low a grade as that employed in the Diesel type of engine may be used, preferably in connection with large trucks and buses where the cost of fuel is great, because this heavy or low-grade fuel is, by means of the structure hereinbefore recited, mechanically broken up into an exceedingly fine mist and mixed with the air drawn into each cylinder of the engine in proportions suitable for a superior economic consumption.

Having thus described an illustrative embodiment of my invention without, however, limiting myself thereto, what I claim and desire to secure by Letters Patent is:

1. An internal combustion engine comprising in combination, a cylinder, an air intake valve, means for mechanically creating an influx of liquid fuel into said cylinder, means for creating an influx of air into said cylinder through said intake valve and mechanical connections for correlating the movements of both of said means to maintain practically constant the ratio of the rate of such influx of liquid fuel to the rate of the influx of air flowing into said cylinder while said intake valve is open.

2. An internal combustion engine comprising in combination, a cylinder, a power piston in said cylinder, a crank shaft pivotally connected to said power piston, a mechanically-driven fuel pump associated with said cylinder, a plunger for said fuel pump, means for actuating said plunger on its delivery stroke in synchronism with said power piston during the first portion of the intake stroke of said power piston, means for completing said delivery stroke during the remaining portion of said intake stroke and during the first portion of the compression stroke, and for holding said plunger at the end of its delivery stroke during the remaining portion of the compression stroke, and during the entire power stroke, of said power piston.

3. An internal combustion engine comprising in combination, a cylinder, a power piston therein, a mechanically-driven fuel pump associated with said cylinder, a plunger for said fuel pump, a mechanically-driven cam for actuating said plunger during a portion of the delivery stroke thereof, and a supplemental cam for completing the delivery stroke of said plunger and maintaining the same at the end of such delivery stroke during a portion of the compression stroke of said power piston and during the entire power stroke thereof.

4. An internal combustion engine comprising in combination, a cylinder, a power piston in said cylinder, a mechanically-driven fuel pump associated with said cylinder, a plunger for said fuel pump, a cam shaft mounted for rotary and limited longitudinal movement, a conical cam mounted eccentrically on said cam shaft for actuating said plunger during a portion of the delivery stroke thereof, a supplemental cam for completing the delivery stroke of said plunger and maintaining the same at the end of such delivery stroke during a portion of the compression stroke of said power piston and during the entire power stroke thereof, and resilient retractile means for actuating said plunger on its suction stroke.

5. An internal combustion engine comprising in combination a cylinder, a power piston therein, an air intake valve, a mechanically-driven fuel pump associated with said cylinder, a plunger for said fuel pump, means for actuating said plunger during a portion of the delivery stroke thereof, and means for completing the delivery stroke of said plunger after the air intake valve has closed.

6. An internal combustion engine comprising in combination a cylinder, a power piston, an air intake valve, means for mechanically creating an influx of liquid fuel into said cylinder at a given rate of speed while said intake valve is open, and other means for creating such influx of liquid fuel into said cylinder during the latter portion of the intake stroke of the power piston and continuing the same until after said intake valve has closed.

7. An internal combustion engine comprising in combination a cylinder, an air intake valve for said cylinder, a crank shaft, a power piston pivotally connected to said crank shaft, a mechanically driven fuel pump associated with said cylinder, and mechanical connections actuated by said crank shaft for correlating the movements of said pump, power piston and air-intake valve to maintain practically constant the ratio of the rate of influx of liquid fuel flowing into said cylinder on the delivery stroke of said fuel pump to the rate of the influx of air flowing into said cylinder while said air intake valve is open.

8. An internal combustion engine comprisng in combination a cylinder, an air intake valve for said cylinder, a crank shaft, a power piston pivotally connected to said crank shaft, mechanical means for creating an influx of liquid fuel into said cylinder, means for varying the volume of said influx of liquid fuel according to the load on the engine, and mechanical connections actuated by said crank shaft for correlating the movements of said mechanical means, power piston and air intake valve to maintain practically constant the ratio of the rate of influx of liquid fuel delivered to said cylinder by said mechanical means to the rate of the influx of air flowing into said cylinder while said air intake valve is open.

9. An internal combustion engine comprising in combination, a cylinder, an air intake valve for said cylinder, a power piston, whereby an influx of air into said cylinder is created on the intake stroke thereof, mechanical means for creating an influx of liquid fuel into said cylinder, and mechanism for so governing and timing the operation of said mechanical means with respect to said power piston as to maintain practically constant the ratio of the rate of such influx of liquid fuel to the rate of the influx of air flowing into said cylinder while said air intake valve is open.

In testimony whereof, I have hereunto subscribed my name this 31st day of October, 1927.

HENRY H. CUTLER.